United States Patent [19]

Statton

[11] 3,987,012
[45] Oct. 19, 1976

[54] THERMOPLASTIC POLYURETHANE-POLYMER COMPOSITIONS AND THEIR PREPARATION

[75] Inventor: Gary L. Statton, Wallingford, Pa.

[73] Assignee: Atlantic Richfield Company, Los Angeles, Calif.

[22] Filed: Feb. 18, 1975

[21] Appl. No.: 550,254

[52] U.S. Cl. .................................. 260/77.5 CR
[51] Int. Cl.² ................................ C08G 18/62
[58] Field of Search ............ 260/77.5 CR, 77.5 AM, 260/77.5 CH, 2.5 AM, 77.5 AC

[56] References Cited
UNITED STATES PATENTS

| | | | |
|---|---|---|---|
| 3,119,793 | 1/1964 | Inaba et al. | 260/77.5 C |
| 3,427,366 | 2/1969 | Verdol et al. | 260/77.5 CR |
| 3,582,508 | 6/1971 | McIntosh | 260/77.5 CR |
| 3,661,808 | 5/1972 | Kennedy | 260/77.5 AC |
| 3,674,743 | 7/1972 | Verdol et al. | 260/77.5 CR |
| 3,846,351 | 11/1974 | Huffaker et al. | 260/77.5 AC |

*Primary Examiner*—M. J. Welsh
*Attorney, Agent, or Firm*—Coleman R. Reap

[57] ABSTRACT

Thermoplastic polyurethane-polymer compositions having improved elastic properties are prepared by reacting hydroxylated diene polymers with diisocyanates in the presence of about 10 to 50% of a diamine, based on the total weight of hydroxyl-terminated diene polymer and diamine, said diamine being a mixture of disecondary diamines and secondary-tertiary diamines and said mixture comprising 1 to 10% secondary-tertiary diamines.

8 Claims, No Drawings

THERMOPLASTIC POLYURETHANE-POLYMER COMPOSITIONS AND THEIR PREPARATION

BACKGROUND OF THE INVENTION

This invention relates to polyurethane-polyurea compositions and, more particularly, to thermoplastic polyurethane-polymer compositions having good elasticity and stability.

Thermoplastic polyurethane-polyureas are conventionally prepared from polyols, such as polyester polyols and polyether polyols, having a functionality of approximately two and diamines having one or two reactive hydrogen atoms per amine group. Such polyurethane-polyurea compositions often have poor hydrolytic stability because of the presence of the polyester and polyether linkages in the polymer chain. Furthermore, conventional polyurethane-polyurea compositions are generally prepared from diamines whose functional groups are all or substantially all primary amine groups. The urea group resulting from the reaction between a primary amine and an isocyanate contains at least one reactive hydrogen atom and hence readily undergoes biuret formation, resulting in the production of a crosslinked polymer and a reduction in those physical properties attributable to the thermoplastic nature of the polymer. Because of the potential utility of polyurethane-polyurea compositions which are hydrolytically stable and which do not readily undergo crosslinking, a great deal of effort has been expended in research to develop polyurethane-polyurea compositions having these properties. Thus, various organic diols have been used in place of or in addition to polyester and polyether polyols. For example, U.S. Pat. Nos. 3,427,366 and 3,674,743 describe polyurethane compositions prepared from hydroxylated diene polymers which have improved hydrolytic stability.

Polyurethane-polyurea compositions have now been discovered which have good hydrolytic stability and resist degradation in elastic properties.

Accordingly, it is an object of this invention to present polyurethane-polyurea compositions which have excellent hydrolytic stability and resist loss of elasticity. It is another object of the invention to present polyurethane-polyurea compositions which have good retention of thermoplastic properties. These and other objects of the invention will become apparent from the following description and examples.

SUMMARY OF THE INVENTION

The improved polyurethane-polyurea compositions of the invention are prepared by reacting a diisocyanate with a mixture containing about 50 to 90 parts of a hydroxylated polymer of a 1,3-diene hydrocarbon of 4 to 12 carbon atoms having a number average molecular weight of about 400 to 25,000 and about 2.0 to 2.2 predominantly primary terminal allylic hydroxyl groups per molecule, and about 10 to 40 parts of a diamine component containing disecondary diamines and secondary-tertiary diamines and substantially free from primary amine groups. The relative amounts of diisocyanate and total hydroxyl and secondary amine containing compounds used to prepare the compositions of the invention are such that the ratio of isocyanate groups to total hydroxyl groups and secondary amine groups in the reaction mixture is about 0.85 to 2.2:1. The percentage of secondary-tertiary diamine in the diamine component is about 1 to 10%, based on the weight of the diamine component. In preferred embodiments of the invention, the polyisocyanate is an aromatic diisocyanate; the hydroxylated polymer of a 1,3-diene hydrocarbon is hydroxylated polybutadiene; the ratio of isocyanate groups to total hydroxyl groups and secondary amine groups in the reaction mixture is about 0.95 to 1.3:1; and the relative amounts of hydroxylated polymer of the 1,3-diene and diamine component present in the reaction mixture is about 50 to 80 parts of hydroxylated polymer and about 20 to 50 parts of diamine component, based on the total weight of hydroxyl and reactive amine groups present in the reaction medium.

DESCRIPTION OF THE INVENTION

The compositions of this invention may be prepared according to any one of the well-known procedures for preparing polyurethanes. Thus, the "one shot method" in which all of the reactants are combined in a suitable reaction vessel and heated with continued agitation in the presence of a suitable polymerization catalyst can be used. Likewise, under certain conditions it may be desirable to employ the prepolymer method in which a portion of one of the reactants is combined with another reactant to form a prepolymer and the remaining part of the first reactant is combined with the prepolymer in a subsequent polymerization step. For example, it may be desirable to react all or a portion of the hydroxyl component with the diisocyanate component to form an isocyanateterminated prepolymer. The prepolymer can then be reacted with the remaining portion of the hydroxyl-containing component and the diamine component to form the finished product. This method can be used to advantage in the present invention when other diols are included in the formulation, thereby raising the possibility of a compatability problem. If the diene polymer component is reacted with the polyisocyanate to form a prepolymer, and the resulting prepolymer reacted with the remaining dihydroxyl-containing components and the diamine component, the final composition is completely homogeneous. In any event, workers skilled in the art will be easily able to determine the optimum reaction conditions for preparing the compositions of the invention.

THE DIISOCYANATE COMPOUNDS

The organic diisocyanates employed in the reaction of the invention may be any of the diisocyanates conventionally used to prepare polyurethanes. Suitable diisocyanates include saturated and ethylenically unsaturated aliphatic and cycloaliphatic compounds, aromatic compounds, aliphatic-substituted aromatic compounds, and aryl-substituted aliphatic compounds, etc. Aromatic diisocyanates are preferred over aliphatic diisocyanates as they are considerably less toxic and therefore present fewer handling problems, and furthermore, they are generally more reactive than aliphatic diisocyanates. The diisocyanates used in the invention may contain substituents provided they do not interfere with the desired reaction between the diisocyanates and the polyols and diamines.

Included among the aliphatic diisocyanates usable in the invention are alkylene diisocyanates, such as 1,3-trimethylene diisocyanate; 1,4-tetramethylene diisocyanate; 1,6-hexamethylene diisocyanate; 1,4-cyclohexane diisocyanate; 1,4-cyclohexene diisocyanate; 1,4-diisocyanate butene-2. Examples of preferred aromatic isocyanates are tolylene diisocyanate; p-phenylene diisocyanate; diphenyl methane diisocyanate; dimethyl diphenyl methane diisocyanate; bibenzyl diisocyanate; bitolyl diisocyanate; 1,5-tetrahydronaphthalene diisocyanate; 4-chloro-1,3-phenylene diisocyanate; etc. In the case of aromatic diisocyanates, the isocyanate groups may be attached to the same or different rings.

THE DIHYDROXYL DIENE POLYMERS

The dihydroxyl diene polymers used in the preparation of the novel compositions of the invention have about 2 to 2.2 predominantly primary, allylic, terminal hydroxyl groups per polymer molecule. Although the term "dihydroxyl diene polymer" is sometimes used in this specification to describe this component, it is recognized that some molecules may contain more than two hydroxyl groups and some molecules may contain only one hydroxyl group as a result of the process used to produce these compounds. It has been found that when the hydroxylated diene polymer contains about 2 to 2.2 hydroxyl groups per molecule, excellent results are obtained in this invention and the elastic properties of the polymeric product are retained indefinitely. The hydroxylated diene polymers which produce compositions having the greatest utility are those having primary hydroxyl groups in terminal allylic positions on the main, generally longest, hydrocarbon chain of the molecule. By "allylic" configuration is meant the alpha-allylic grouping of allylic alcohol, that is, the terminal hydroxyls of the intermediate diene polymer are attached to a carbon adjacent to a double bond carbon. By terminal hydroxyl is meant that the hydroxyl is attached to a terminal carbon atom, that is, the carbon atom at the end of the polymer chain.

Hydroxylated diene polymers used in preparing the compositions of the invention may have a viscosity at 30° C of about 5 to 20,000 poises, preferably about 15 to 5,000 poises. When the hydroxylated diene polymer is a homopolymer, the viscosity is often in the range of about 20 to 500 poises at 30° C. Preferred hydroxylated homopolymers are those of butadiene having a viscosity of about 35 to 60 poises and preferred hydroxylated copolymers are those of butadiene and another vinyl monomer such as styrene, acrylonitrile, etc., having a viscosity of about 150 to 300 poises at 30° C. The intermediate polymers are essentially liquids, including semi-solids flowable under moderate pressure at ambient temperatures or at temperatures in the range of −100° to 400° F. The hydroxyl-containing diene polymers used in the invention have a number average molecular weight in the range of about 400 to 25,000 as determined by cryoscopic, ebullioscopic or osmometric methods. The preferred hydroxyl-containing diene homopolymers and copolymers have a molecular weight range of about 900 to 10,000.

Dienes which are employed to make the hydroxylated 1,3-diene polymers are unsubstituted, 2-substituted or 2,3-disubstituted 1,3-dienes of up to about 12 carbon atoms. The diene preferably has up to about 6 carbon atoms and the substituents in the 2- and/or 3-position may be hydrogen, alkyl, generally lower alkyl, e.g., of 1 to 4 carbon atoms, aryl (substituted or unsubstituted) halogen, nitro, nitrile, etc. Typical dienes which may be employed are 1,3-butadiene, isoprene, chloroprene, 2-cyano-1,3-butadiene, 2,3-dimethyl-1,3-butadiene, etc. The choice of diene will usually depend upon the properties desired in the finished product, e.g., chloroprene may be used alone or in a mixture with other dienes to produce oil-resistant and flame-retardant rubbers.

The number and location of the hydroxyl groups and the molecular weight of the hydroxylated diene polymer are, for the most part, a function of polymerization temperature and the type of addition polymerization system employed in forming the polymer. It has been found that diene polymers of the desired configuration may be obtained using hydrogen peroxide as the catalyst for polymerization. The free-radical addition polymerization usually takes place at a temperature of about 100° to 200° C., preferably about 100° to 150° C. The preparation of suitable hydroxylated diene polymers is described in detail in U.S. Pat. Nos. 3,427,366 and 3,674,743, the disclosures of which are incorporated herein by reference.

THE DIAMINE COMPONENT

The diamine component used in the preparation of the novel products of the invention is a mixture of disecondary diamines and secondary-tertiary diamines having the structural configuration:

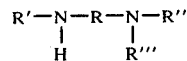

wherein R is a difunctional aromatic or saturated cyclic or acyclic organic radical containing up to 20 carbon atoms, R and R'' are the same or different aromatic or saturated aliphatic or cycloaliphatic organic radicals containing up to 20 carbon atoms, and R''' is hydrogen or an aromatic or saturated aliphatic or cycloaliphatic organic radical containing up to 20 carbon atoms, and R, R', R'' and R''' are free of substituents which interfere with the desired reaction between the isocyanate radicals and the hydroxyl and secondary amine groups. R, R', R'' and R''' (when an organic radical) is usually a hydrocarbon and, when aromatic, contain one to three condensed or non-condensed rings. R, R', R'' and R''' (when an organic radical) are preferably hydrocarbon radicals and contain up to two rings when aromatic and up to 18 carbon atoms when saturated aliphatic or cycloaliphatic.

When R''' is hydrogen the diamine component contains two secondary amine groups, and when R''' is an organic radical the diamine compound contains a secondary amine group and a tertiary amine group. The weight percentage of secondary-tertiary diamine compound in the diamine component may vary from about 1 to 10% and is preferably in the range of about 3 to 7%.

Typical disecondary diamines usable in the invention include N, N'-diethyl-1,6-hexanediamine; N, N'-dihexyl-1,4-cyclohexanediamine; N,N'-bis(1,4-dimethylpentyl)-1,4-benzenediamine; N,N'-bis(1-methylbutyl)-1,4-benzenediamine; N,N'-diphenyl-tetramethylenediamine; N,N'-diphenyl-1,4-benzenediamine; N,N'-bis(p-chlorophenyl)-1,4 cyclohexanediamine; N-methyl-N'-2-methylethyl-1,3-benzenediamine, etc.

Typical of the secondary-tertiary diamines usable in the invention are N,N'-diethyl-N-hexyl-1,8-octanediamine; N,N'-dipentyl-N-2-methylethyl-1,4-benzenediamine; N,N'-dipentyl-N-2-methylphenyl-1,4-benzenediamine; etc. The preferred disecondary diamine compounds are the alkyl- and aryl-substituted benzenediamines such as N,N'-bis (1,4-dimethylpentyl)-1,4-benzenediamine. The preferred secondary-tertiary diamine compounds are alkyl- and aryl-substituted diamines in which the three nitrogen substituents are the same, such as N,N,N'tris (1,4-dimethylpentyl)-1,4-benzenediamine.

The relative amounts of hydroxylated diene polymer and diamine component present in the reaction mixture is such that the ratio of hydroxyl groups to secondary amine groups in the reaction mixture is about 1 to 6:1 and preferably 1 to 4:1.

The relative amounts of diisocyanate component and total hydroxyl and diamine components present in the reaction mixture is such that the ratio of isocyanate to total hydroxyl and secondary amine groups is in the range of about 1.5 to 2.2:1 and preferably about 1.8 to 2.1:1. The optimum ratio of components will depend upon the type of product desired and the amount of secondarytertiary amine present in the diamine component.

Although the preparation of the compositions of this invention may be carried out without a catalyst, i.e., by thermal initiation, it is preferred to carry out the polymerization in the presence of a catalyst in order to accelerate curing. Conventional catalysts for the formation of polyurethanes from isocyanates and polyols may be used, including basic compounds such as tertiary amines, e.g., triethylamine, diazobicyclooctane, and triethylene diamine; and organometallic compounds such as dibutyltin dilaurate, stannous octoate, lead octoate, cobalt naphthenate, aluminum isopropoxide, etc. The catalyst is generally used at a concentration of about 0.05 to 5% and preferably about 0.1 to 2% based on the weight of total reactive components in the reaction mixture.

The reaction may be carried out in the presence or absence of a solvent. When a solvent is used, it is preferred to use a volatile organic liquid in which the reactants are soluble such as cellosolve acetate, methylene chloride, dimethyl formamide. It is often not necessary that a solvent be used since the reactants are generally miscible liquids.

The reaction is generally carried out at a temperature of about 20° C. to 350° C. and preferably at a temperature of about 25° C. to 120° C.

It is often desirable to modify the physical properties of the thermoplastic product by incorporating low molecular weight diols, which serve as stiffening agents, into the reaction formulation. These diols are preferably derived from hydrocarbons containing 2 to 10 carbon atoms and may be saturated aliphatic, including cycloaliphatic, or aromatic. Typical suitable diols include ethylene glycol, 1,4-butane diol, 1,6-hexane diol, 1,4-cyclohexane diol, 1,4-benzene diol, etc. These diols may be present in an amount of up to 40%, and preferably up to 20%, based on the total weight of hydroxyl-containing components in the reaction mixture.

Other additives including fillers such as carbon, silica, silica-alumina, zinc oxide, clays, talc, etc.; extending agents such as polyols or other low molecular weight polymeric materials; plasticizers such as adipate or phthalate esters or esters of trimethylol, glycerine, etc.; antioxidants; coloring agents; etc. These materials may be incorporated into the compositions of the invention by addition to the reaction formulation or by inclusion into the composition during or subsequently to curing.

In a preferred embodiment the compositions of the invention are prepared by combining the diisocyanate, dihydroxyl-containing diene polymer, the diamine component and other additives which it is desired to include at this point in a suitable reaction vessel equipped with a thermometer, and an agitator. An effective amount of catalyst is added to the reaction mixture and the mixture is heated to and maintained at the reaction temperature until the desired degree of conversion takes place. This is usually indicated by a change in the viscosity of the reacting mixture.

The products of the invention have been found to possess, in addition to superior hydrolytic stability, improved retention of elastic properties, as evidenced by solution studies. The improved product of the invention has utility in various types of construction application, e.g., in the manufacture of molded parts, waterproof membranes, seals, gaskets, etc., and electrical applications such as potting compounds, encapsulants, cable fillers, electrical connectors, etc.

The following examples illustrate specific embodiments of the invention. Unless otherwise specified, parts and percentages are on a weight basis. The following ASTM procedures were followed:

Tensile strength, modulus, and elongation - ASTM D-412-61T;

Tear strength — ASTM D-624-54, Die C;

Hardness — ASTM D-2240-64.

EXAMPLE I

A hydroxyl terminated polybutadiene having a functionality of 2.05 and a molecular weight of 2,700 is degassed at 125° C. for 30 minutes under vacuum and then cooled to room temperature. To 85g of this polymer is added 36.05g of 4,4'-diphenylmethane diisocyanate and one drop of dibutyltindilaurate as catalyst. The mixture is stirred for 15 minutes at room temperature and then heated to 40°C. for a further 30 minutes.

The viscous liquid is cooled to room temperature and 34.97g of N,N'-bis(1,4-dimethylpentyl)-1,4-benzenediamine containing 6% by weight N,N,N'-tris(1,4-dimethylpentyl)-1,4-benzenediamine is added. The mixture is stirred until the viscosity increases to a substantial value and the material is transferred to a mold and cured for 3 hours at 80° C. After demolding the material is postcured for 2 days at 50° C. The polyurethane polymer is dissolved in toluene and a film is prepared by solution casting.

The film on evaporation of the solvent exhibits the following properties:

| | |
|---|---|
| Tensile strength (psi) | 2080 |
| Elongation (%) | 655 |
| Tear strength (psi) | 278 |
| Modulus 100% | 620 |
| 200% | 700 |
| 300% | 850 |

EXAMPLE II

Following the procedure of Example I, a polyurethane-polyurea polymer is prepared from 85.0g of the hydroxyl-terminated diene polymer, 58.45g of 4,4'-diphenyl methane diisocyanate and 62.37g of N,N'-bis(1,4-dimethylpentyl)-1,4-benzenediamine containing 6% by weight N,N,N'tris(1,4-dimethylpentyl)-1,4-benzenediamine. The polyurethane polymer is soluble in benzene and can be easily molded. The polymer exhibits the following properties:

| | |
|---|---|
| Tensile strength (psi) | 3468 |
| Elongation (%) | 563 |

| | |
|---|---|
| Tear strength (psi) | 586 |
| Modulus 100% | 1450 |
| 200% | 1518 |
| 300% | 1580 |
| Shore D Hardness | 61 |

EXAMPLE III

Following the procedure of Example I a hydroxyl terminated polybutadiene having a functionality of 2.06 and a molecular weight of 2760 is reacted with 36.05g of 4,4'-diphenylmethane diisocyanate and extended with 34.97g of N,N'-bis(1,4-dimethylpentyl)-1,4-benzenediamine containing 6% by weight N,N,N'-tris(1,4-dimethylpentyl)1,4-benzenediamine. The polymer on curing is soluble in benzene and can be molded. The polymer exhibits the following properties:

| | |
|---|---|
| Tensile strength (psi) | 2915 |
| Elongation (%) | 713 |
| Tear strength (psi) | 369 |
| Modulus 100% | 710 |
| 200% | 789 |
| 300% | 929 |
| Shore D Hardness | 45 |

EXAMPLE IV

Following the procedure of Example III, a polyurethane-polyurea polymer is prepared from 85g of the hydroxyl-terminated diene polymer, 36.05g of 4,4'-diphenylmethane diisocyanate and 25.18g of N,N'-bis(1,methylbutyl)1,4-benzenediamine containing 6% by weight N,N,N'-tris (1-methylbutyl)-1,4-benzenediamine. The polymer on curing is soluble in toluene and exhibits the following properties:

| | |
|---|---|
| Tensile strength (psi) | 3850 |
| Elongation (%) | 680 |
| Tear strength (psi) | 450 |
| Modulus 100% | 956 |
| 200% | 1158 |
| 300% | 1404 |
| Shore D Hardness | 49 |

The above examples illustrate that thermoplastic polyurethane-polyurea compositions having good elasticity and solubility can be prepared by reacting a hydroxylterminated polybutadiene with a diisocyanate and a disecondary diamine containing 6% secondary-tertiary diamine.

Although the invention has been described with reference to specific examples, it is understood that the breadth of the invention is not limited thereto but is only determined by the scope of the appended claims.

I claim:

1. A thermoplastic polyurethane-polyurea composition prepared by condensing
   a. a hydroxylated diene polymer containing about 2 to 2.2 predominantly allylic, terminal hydroxyl groups per molecule and being an addition polymer of 0–75% by weight of an alpha-monoolefinic monomer of 2 to 12 carbon atoms, and about 25 to 100% of a 1,3-diene hydrocarbon of 4 to 12 carbon atoms, said polymer having a viscosity at 30° C of about 5 to 20,000 poises and a number average molecular weight of about 400 to 25,000,
   b. a diisocyanate, and
   c. a diamine component substantially free of primary amine groups consisting of a mixture of disecondary diamine compounds and secondary-tertiary diamine compounds, the weight percentage of secondarytertiary diamine compounds in said mixture being about 1 to 10, the ratio of isocyanate groups to total hydroxyl and secondary amine groups being about 1.5 to 2.2:1 and the ratio of hydroxyl groups to secondary amine groups being about 1 to 6:1.

2. The composition of claim 1 wherein said hydroxylated diene polymer is hydroxylated polybutadiene having a molecular weight of about 900 to 10,000.

3. The composition of claim 1 wherein the relative amounts of diisocyanate compound, hydroxylated diene polymer and diamine component are such that the ratio of isocyanate groups to total hydroxyl and secondary amine groups is 1.8 to 2.1:1.

4. The composition of claim 1 wherein the relative amounts of hydroxylated diene polymer and diamine component are such that the ratio of hydroxyl groups to secondary diamine groups in said composition is about 1 to 4:1.

5. The composition of claim 4 wherein the diamine component contains about 3 to 7% by weight secondarytertiary diamine compound.

6. The composition of claim 1 wherein said diamine component consists of N,N'-bis (1,4-dimethylpentyl)-1,4-benzenediamine and N,N,N'-tris(1,4-dimethylpentyl)-1,4-benzenediamine.

7. A thermoplastic polyurethane-polyurea composition prepared by condensing
   a. a hydroxylated polybutadiene containing about 2 to 2.2 predominantly allylic terminal hydroxyl groups per molecule and having a viscosity at 30° C. of about 5-20,000 poises and a number average molecular weight of about 900 to 10,000,
   b. a diisocyanate selected from tolylene diisocyanate, diphenylmethane diisocyanate and mixtures of these,
   c. a diamine component substantially free of primary amine groups consisting of about 90 to 99% by weight N,N'-bis(1,4-dimethylpentyl)-1,4-benzenediamine and about 1 to 10% by weight N,N,N'-tris (1,4-dimethylpentyl)-1,4-benzenediamine, the relative amounts of diisocyanate, hydroxylated butadiene and diamine component in said composition being such that the ratio of isocyanate to total hydroxyl groups and secondary diamine groups is in the range of about 1.8 to 2:1 and the ratio of hydroxyl groups to secondary amine groups is in the range of about 1 to 4:1.

8. The composition of claim 7 additionally containing up to about 40% based on the total weight of the polymeric composition of a hydrocarbon diol containing 2 to 10 carbon atoms.

* * * * *